Figure 1:
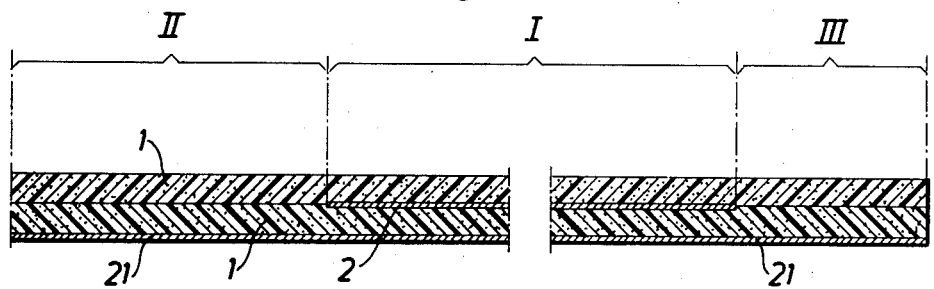

United States Patent [19]

Rausing

[11] 4,014,724
[45] Mar. 29, 1977

[54] BOTTLE-SHAPED CONTAINERS OF THE ONE-WAY TYPE AND A METHOD FOR THE MANUFACTURE OF THE SAME

[76] Inventor: Ruben A. Rausing, Via Kenia 22-24, Rome, Italy

[22] Filed: Dec. 15, 1975

[21] Appl. No.: 640,861

[30] Foreign Application Priority Data

Jan. 3, 1975 Switzerland ............................ 2/75

[52] U.S. Cl. .......................... 156/86; 156/198; 156/203; 156/214; 156/218; 156/242; 156/267; 156/459; 215/1 C; 264/230; 264/321; 264/DIG. 71; 425/403; 428/36; 428/313; 428/314; 428/315; 428/913

[51] Int. Cl.² ........................................ B29C 27/29

[58] Field of Search ............ 156/86, 198, 203, 212, 156/216, 218, 459, 229, 267; 425/403; 215/1 C; 264/321, DIG. 71, 230; 428/36, 313, 314, 315, 913

[56] References Cited

UNITED STATES PATENTS

| | | | |
|---|---|---|---|
| 2,885,105 | 5/1959 | Heyl et al. | 156/88 |
| 3,542,229 | 11/1970 | Beyerlein | 215/1 C |
| 3,604,584 | 9/1971 | Shank | 156/86 |
| 3,760,968 | 9/1973 | Amberg | 156/86 |
| 3,767,496 | 10/1976 | Amberg | 156/86 |

Primary Examiner—Edward G. Whitby
Attorney, Agent, or Firm—Pierce, Scheffler & Parker

[57] ABSTRACT

A one-use bottle-shaped container has a cylindrical shell portion, a base portion which has an inturned flange continuous with the shell portion, a central disc sealed to the flange and a bottleneck-shaped upper portion terminating in an opening considerably smaller than the cross-sectional area of the cylindrical portion.

4 Claims, 8 Drawing Figures

BOTTLE-SHAPED CONTAINERS OF THE ONE-WAY TYPE AND A METHOD FOR THE MANUFACTURE OF THE SAME

The present invention relates to a bottle-shaped container of the one-way type and a method for the manufacture of such containers.

It is a known practice in packing technology to replace glass bottles by similar bottles made of plastics material. Especially bottles for cheaper wines are often made of plastics material, and for the manufacture of such a plastics bottle of sufficient rigidity and impermeability to gases most frequently polyvinyl chloride is used, which can be formed relatively easily by blowing or deep drawing. Polyvinyl chloride has great disadvantages, however, from an environmental point of view owing to the fact that the poisonous and aggressive chemical hydrocloric acid gas is formed during the combustion of the polyvinyl chloride material. In view of the disadvantages of the polyvinyl chloride plastics it has been prohibited as a packing material in certain states and it is therefore important to attempt to find a material to replace polyvinyl chloride. Other plastics materials certainly exist which have equally good or better impermeability properties than polyvinyl chloride and which can be formed by means of blowing or deep drawing, but it has not been possible until now to use these materials commercially owing to their high price and because these materials moreover have a relatively great brittleness which entails the risk of bursting if e.g. a bottle made of such material is subjected to impacts or thrusts in connection with transport and handling.

The above-mentioned disadvantages are avoided with a container in accordance with the invention, which is characterized in that the container body has a cylindrical shell portion of substantially circular or square cross-section, a base portion which has a folded-in flange continuous with the shell portion, a central disc sealed to the said flange and an upper bottleneck-shaped, tapering portion which has an opening area that is considerably smaller than the cross-sectional area of the cylindrical portion of the container. The invention is characterized further by the method for the manufacture of the said container in that a flat blank of a packing laminate, which has three zones, namely a middle zone comprising at least two heat-shrinkable foamed plastics layers, which are subjected to such a stretching during manufacture that the individual cells of the foamed plastics become elongated or lenticular, and that between the said foamed plastics layers a layer of homogeneous or fibrous material, e.g. plastics, paper, metal foil or glass film is arranged, and two outer zones of shrinkable foamed plastics material without an intermediate laminating layer. The said blank comprising three laminate zones is first bent over with the help of a first mandrel to a tube of the desired cross-section and shape, which tube is obtained in that overlapping edge zones of the blank are sealed to each other, whereupon the blank is drawn off the first mandrel and is transferred to a second mandrel which is profiled so that it has a shape and size corresponding to the upper, bottleneck-shaped part of the container, the said tube being applied so to the said second mandrel that the parts of the packing laminate which do not have any middle layer are located on the area of the said second mandrel which has been given the same shape as the upper, bottleneck-shaped part of the package, and that finally the parts of the tube formed which cover the profiled part of the second mandrel are heated up so much that the foamed plastic material is caused to shrink so as to form a close fit to the contour of the mandrel.

Figure 2:
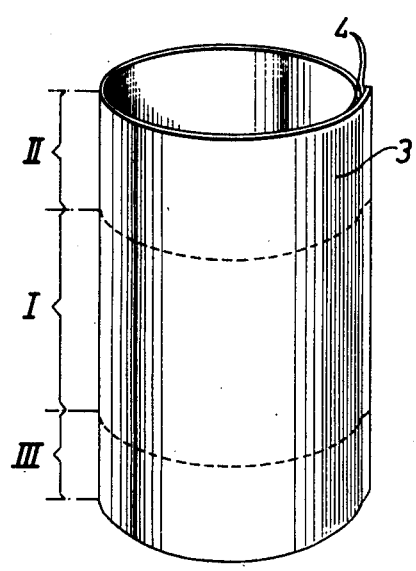
Figure 3:
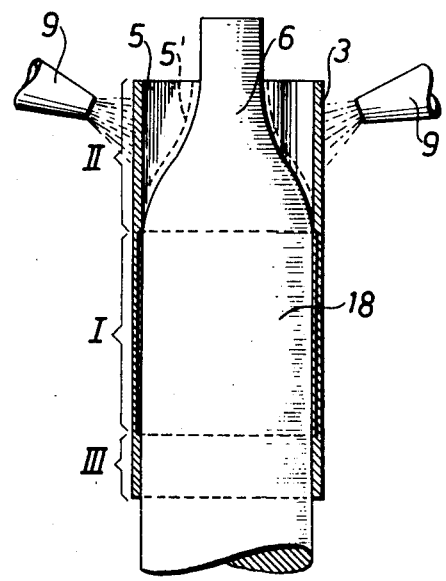
Figure 4:
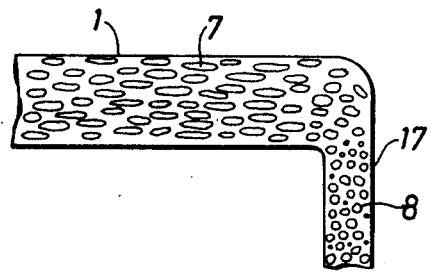
Figure 5:
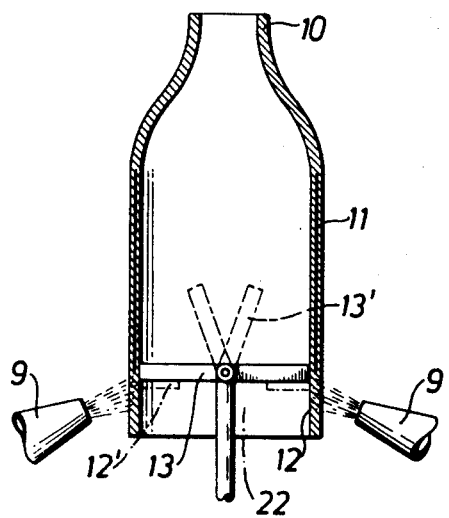
Figure 6:
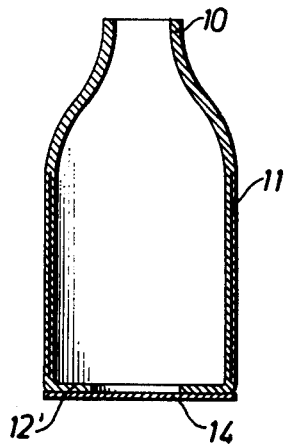
Figure 7:
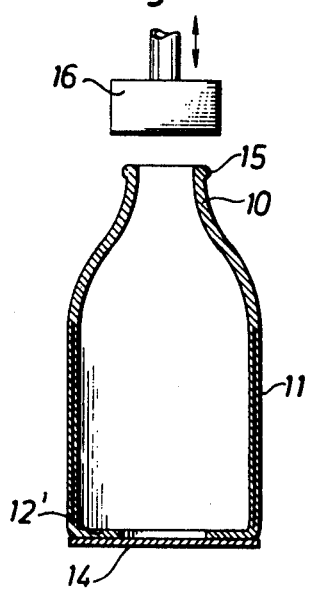
Figure 8:
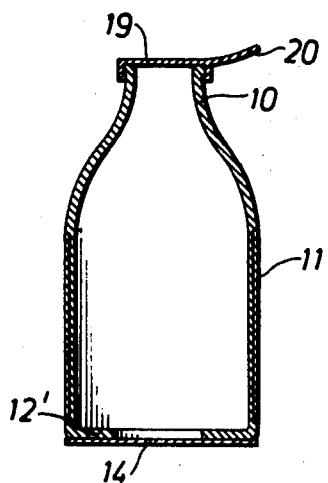

In the following will be described an embodiment of the invention with reference to the enclosed schematic drawing, in which FIG. 1 shows a greatly enlarged broken cross-section of a laminated blank for the packing container in accordance with the invention, FIG. 2 shows the blank illustrated in FIG. 1, which has been bent to a tube of circular cylindrical cross-section, FIG. 3 shows in cross-section how the circular cylindrical tube is placed onto a mandrel with the object of shaping by shrinkage a part of the cylinder to a bottleneck-shaped part, FIG. 4 shows a greatly enlarged cross-section of a foamed plastics material which in the manufacture is stretched with the object of giving the individual cells an elongated or lenticular shape, FIG. 5 shows how the cylinder provided with a bottleneck-shaped part is given a bottom flange by the shrinking-in of the edge zone of the cylinder over a collapsible mandrel, FIG. 6 shows a cross-section of the packing container after it has been provided with a base cover disc, FIG. 7 shows how the opening of the bottleneck-shaped part is machined with a preferably plane tool so as to produce a plane opening part which is of the same kind for all similar packing containers, and FIG. 8 shows a cross-section of the finished packing container after the same has been filled and provided with a cap device.

In FIG. 1, which shows a greatly enlarged broken blank of a laminate material intended to be used for the manufacture of packing containers in accordance with the invention, the outer foamed plastics layers of the laminate are marked 1 and an inner intermediate layer which covers part I of the laminate is marked 2. The intermediate layer 2 may be constituted of a homogeneous or fibrous material, e.g. homogeneous plastic material, metal foil, glass film or paper, and the said intermediate layer 2 has the object of imparting rigidity to the laminate material whilst at the same time the tensile strength of the foamed plastics layer 1 is considerably improved, provided good adhesion prevails between the intermediate layer 2 and the outer foamed plastics layer 1.

In the following it will be assumed that the foamed plastics layers 1 consist of polystyrene foam which has been made by extrusion and which during manufacture has been subjected to a stretching process with the object of shaping the bubbles or cells included in the foamed plastics layer so that they become elongated or lenticular, depending on whether the stretching takes place in one or two directions. The reason for subjecting the foamed plastics layers 1 to such a stretching is that the material then becomes shrinkable under the effect of heat, which entails that the material can easily be formed over a mandrel when heat is applied uniformly and to such an extent that the plastics material softens with the elongated or lenticular cells endeavouring to assume a spherical shape. This phenomenon is illustrated in FIG. 4, which shows one of the layers 1 of the foamed plastics material, which layer has elongated or lenticular cells 7, which in FIG. 4 are shown greatly enlarged and not true to scale. It can be seen from FIG. 4 that a part of the foamed plastics layer 1 is shrunk-in to a flange 17 and that the individual cells in this shrunk-in flange have spherical shape.

Returning to FIG. 1, it can be seen here that the blank is divided into three zones, namely a middle zone I, which comprises the outer foamed polystyrene plastics layers 1 and the intermediate layer 2, and the outer zones II and III which do not contain an intermediate layer 2. To improve the impermeability to gases of the blank it is shown that one of the outsides of the blank is provided with a gastight coating of e.g. polyvinylidene chloride, which is marketed under the tradename SARAN, or an acrylonitrile plastics of the type which is marketed under the tradename BAREX. Since these materials cannot be directly combined with the foamed polystyrene plastics layers by surface fusion, they have to be attached with the help of some form of adhesives which sticks to the foamed plastic material as well as to the coating layer 21.

In FIG. 2 is shown how the blank in accordance with FIG. 1 is bent to a tube of circular cylindrical cross-section. This operation is appropriately carried out with the help of a circular cylindrical mandrel, whereupon the overlapping edge portions 4 of the blank are sealed together by heat-sealing in a tight and mechanically durable joint. As can be seen from FIG. 2, the tube 3 formed is divided into the zones I, II and III mentioned previously, the middle portion I comprising an intermediate layer 2 arranged between the foamed plastics layers 1 which may be of a homogeneous or fibrous material, examples of which were given earlier. After the forming and sealing the tube 3 is drawn off its winding mandrel and is transferred to a second mandrel 18 which comprises a profiled part 6 which is designed as a bottleneck. When the tube 3 is transferred to the mandrel 18 it has to be ensured that the tube 3 is located so on the mandrel so that the zone II of the tube 3 will surround the said profiled part 6 of the mandrel 18, whilst the zones I and III are in close contact with the remaining part of the mandrel. After transferring the tube 3 onto the mandrel 18 the zone II is heated uniformly with the help of heat sources, preferably hot air nozzles 9, whereby the zone II of the tube 3 is made to shrink so as to form a close fit to the profiled part 6 of the mandrel 18. In FIG. 3 the shrunk-in position of the zone II belonging to the part 5 of the tube is marked by broken lines and the indication 5'. After the forming of the bottleneck-shaped part 5' the tube 3 is drawn off the mandrel 18, and instead a collapsible mandrel 13 is introduced into the part of the tube 3 which is marked III. When introducing the mandrel 13 it has to be ensured the projecting part 12 of the tube 3, corresponding to the zone III, is located outside the mandrel 13, whereupon the edge zone 12 is heated with the help of hot air nozzles 9 to such an extent that the edge zone 12, which does not contain any intermediate layer 2, is made to shrink so as to form a flange 12' which fits close to the outside of the collapsible mandrel 13. When the shrinking operation has been completed, the mandrel 13 is folded up by moving its parts together to a position 13', whereupon the mandrel 13 is withdrawn through the hole 18 which is limited by the flange 12'. The central part 11 of the tube corresponding to zone II of the blank has not been subjected to any shrinking deformation, which would be rendered difficult or completely impossible by the intermediate layer 2.

In FIG. 6 is shown how the bottle-shaped container, which has been provided with the shrunk-in flange 12', is provided with a base cover plate 14, which is hot-sealed to the flange 12' or is combined with the same with the help of some form of adhesive. To increase the impermeability to gas it may be appropriate to make the cover plate 14 of the same laminate as described in connection with FIG. 1, with the intermediate layer consisting of any gastight material, e.g. glass film or metal foil. The bottle shown in FIG. 6 has now been given its external shape, but during the shrinking-in of the neck portion 10 a somewhat uneven opening area has been formed which is not suitable for the direct application of a cover strip or cap. The bottle-shaped packing container formed must therefore be subjected to further machining, which takes place in accordance with FIG. 7 in that a heated tool 16 is pressed against the opening part 10 of the container, whereby the foamed plastics material is formed to a bulgelike ring 15 with preferably flat upper side. This forming also gives rise to a compaction of the material in that a part of the cells is made to collapse, which has the result that the opening becomes stiff and well suited to support caps beaded around the opening. If desired the uneven end of the opening of the container may be sheared or cut off with, for example, a conventional rotatable knife to provide the plane end surface for receiving a cap. In FIG. 8 finally is shown how the bottle-shaped packing container is provided with a cap 19 which in the case shown is beaded around the opening, and also heat-sealed to the flat top of the opening with the help of a breakable sealing varnish. To facilitate the removal of the cap when the content of the packing container is to be made accessible, the cap is provided with a pull-tab 20 by means of which the cap 19 can be torn off.

It has to be pointed out that the embodiment of the invention shown here is only intended to illustrate one possible embodiment, and within the scope of the concept of the invention the shape of the bottle as well as the method of its manufacture can be modified. Thus according to requirement the bottle may be provided with a longer or shorter neck, and it is also possible to design the base part in a different manner to that shown here, e.g. by the direct heat sealing of a cover plate to the bottom part of the bottle without shrinking it first to a flange. It has been found, however, that a considerably greater rigidity and strength can be obtained if the flange that has been shown and described is first produced. The collapsible mandrel 13 may be constructed in many different ways starting from an umbrella-like device to a device which can be almost compared with a camera aperture, but since the practical design of the mandrel 13 is of no importance whatever for the present invention, only a schematic example has here been given. The cap shown is also intended only to serve as an example of a possible solution, and it is quite possible, within the scope of the concept of the invention, to provide the bottle-shaped container with any kind of cap device.

It has been found that the bottle-shaped container described here is very light, which is an advantage from a point of view of transport, and it can be manufactured in automatic machines with high production capacity. Since foamed polystyrene plastics material, moreover, is relatively cheap, it has been found that the packing containers are very competitive with other types of one-way packages for wine, and it has been found moreover that the packing containers give the wine an acceptable gas protection, and that the packing containers can be formed in such a manner that the containers are given an attractive appearance. Naturally the packing containers in accordance with the invention may also be used for the packing of goods other than wine, and in principle all types of liquid goods, and also powdery goods, may be used in conjunction with the packing containers.

I claim:

1. A method for making a container from a blank of a laminate material, said laminate having two layers of a heat-shrinkable foamed plastic material and an intermediate layer disposed between the layers of foamed plastic material intermediate the longitudinal ends of the blank to form two end zones and an intermediate continguous transverse zone, said intermediate layer comprising a material selected from the group consisting of a homogeneous plastic material, metalfoil, glass film, and paper said method comprising bending the blank around a first cylindrical mandrel, the axis of which extends transversely of the blank, with the longitudinal ends of the blank overlapping, heat sealing the overlapping longitudinal ends of the blank to form a tube-like element, removing said tube-like element from the first mandrel, placing the tube-like element on a second mandrel having a cylindrical portion for receiving the intermediate transverse zone of the tube-like element and a portion of reduced cross-sectional area at one end thereof adjacent one end zone of the tube-like element, heating the last mentioned end zone of the tube-like element to shrink the end zone to conform with the portion of the second mandrel having a reduced cross-sectional area to form a bottle necked top opening of the container and closing the opposed end zone of the tube-like element to form a liquid tight bottom seal for the container.

2. A method as claimed in claim 1 and further comprising the step of providing the top opening of the container with a plane end surface for receiving a closure member to close the container.

3. A method as claimed in claim 2 wherein the top opening of the container is heat moulded to form the plane end surface thereof.

4. A method as claimed in claim 1 wherein the step of closing the opposed end zone of the tube-like element comprises placing the opposed end zone of the tube-like element on a third collapsible mandrel, heating said opposed end zone to shrink the foamed plastic material thereof inwardly of the tube-like element, collapsing and withdrawing the collapsible mandrel from the tube-like element and sealing a cover disc to the inwardly shrunk opposed end zone to form the liquid tight bottom seal of the container.

* * * * *